Aug. 14, 1945. H. E. SOMES 2,382,826
RECIPROCABLE CARRIAGE
Filed May 19, 1944 2 Sheets-Sheet 1
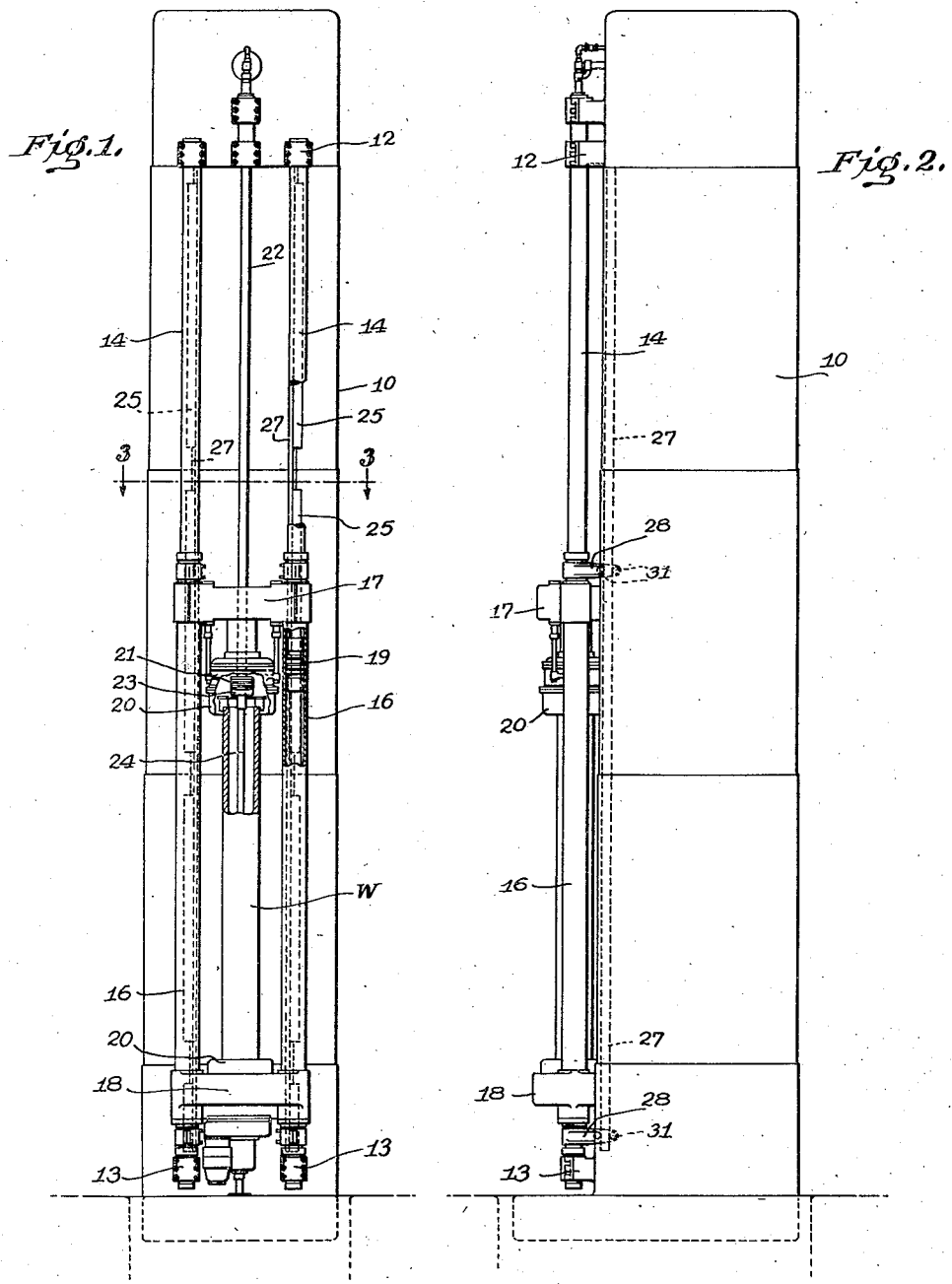
Howard E. Somes
INVENTOR
BY John P Tarbox
ATTORNEY Aug. 14, 1945.　　　H. E. SOMES　　　2,382,826
RECIPROCABLE CARRIAGE
Filed May 19, 1944　　　2 Sheets-Sheet 2

Howard E. Somes
INVENTOR

BY
ATTORNEY

Patented Aug. 14, 1945

2,382,826

UNITED STATES PATENT OFFICE 2,382,826

RECIPROCABLE CARRIAGE

Howard E. Somes, Detroit, Mich., assignor to Budd Induction Heating, Inc., Philadelphia, Pa., a corporation of Michigan Application May 19, 1944, Serial No. 536,239

4 Claims. (Cl. 308—3)

This invention relates to machine and other tools having a work supporting carriage supported on guide rods for reciprocation throughout a stroke of considerable length.

In various types of work on relatively heavy articles, such as, for example, long tubes or cylinders, it is necessary to support the work on a reciprocable carriage mounted on guide rods for a relatively long stroke. In a long tube, or cylinders, for example, wherein work is performed from end-to-end, the guide rods for the carriage must, of necessity, be at least twice as long as the work itself.

The object of the present invention is to provide a novel arrangement for tools of the above character whereby to prevent deflection of the carriage guide rods during the travel of the carriage thereover and thereby permit precision work to be performed on the workpiece with a predetermined degree of accuracy.

With the above and other objects in view which will be apparent from the following description to those skilled in the art to which the invention appertains, the present invention consists of certain features of construction and combinations of parts to be hereinafter described with reference to the accompanying drawings, and then claimed.

In the drawings which illustrate a suitable embodiment of the invention:

Figures 1 and 2 are front and side elevations, respectively, of an induction heat treating machine having the improvements of the present invention incorporated therein;

Figure 3:
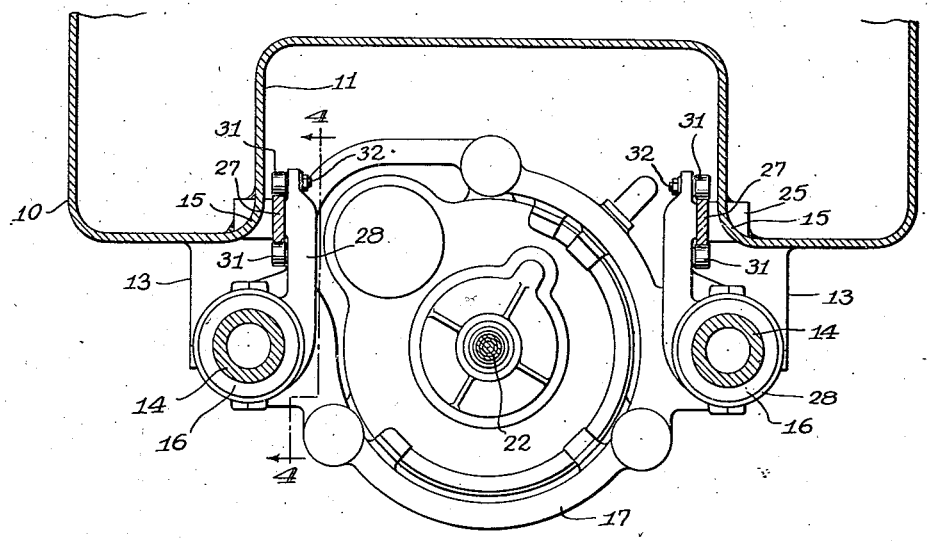
Figure 3 is an enlarged transverse section taken substantially on the line 3—3.
Figure 4:
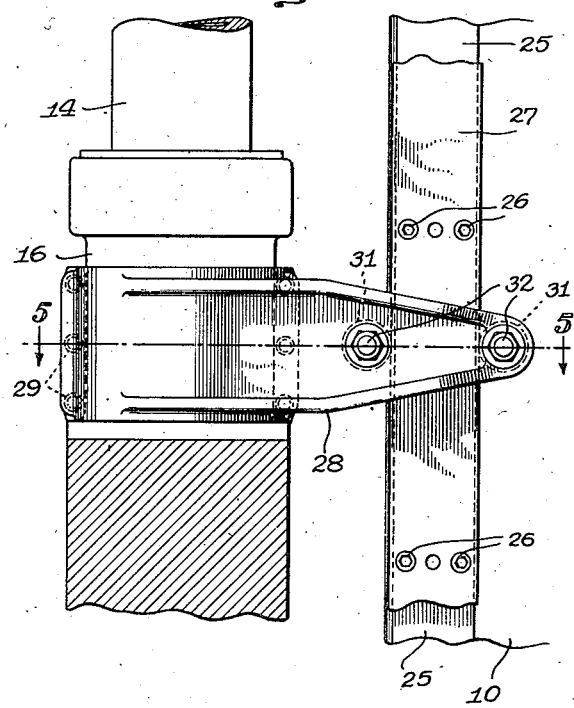
Figure 4 is a longitudinal section taken substantially on line 4—4 of Figure 3.

Referring to the accompanying drawings in which like numerals refer to like parts throughout the several views, I have selected for illustration of the present invention, an induction heat treating machine having a main vertically extending body member 10, the front side of which is recessed as indicated at 11 in Figure 3.

Secured to the front side of the body member 10 by means of upper and lower brackets 12 and 13 are a pair of vertically extending guide rods 14, the brackets 12 and 13 holding the guide rods 14 in spaced relation with respect to the front side of the body member 10 adjacent the corners 15 of the inwardly depressed region 11.

Reciprocably mounted on the guide rods 14 is a carriage embodying cylinders 16 interconnected at their upper and lower ends by cross members 17 and 18. respectively. The carriage is reciprocated by fluid pressure and to this end the guide rods 14 are provided with piston portions 19 with which the cylinders 16 have sliding engagement. Fluid under pressure is admitted to the opposite sides of the piston portions 19 to raise or lower the carriage, as the case may be, the fluid acting against the ends of the cylinders 16 and the piston portions, as is well known in the art. Since the present invention is not concerned with the particular manner of reciprocating the carriage, the various hydraulic connections have not been shown. Such connections are, however, well known in the art.

In the embodiment selected for illustration, a tubular workpiece W is supported between suitable chucking members 20 carried by the cross members 17 and 18. In this embodiment, the inner wall surface is to be internally heat treated. To this end an induction heating head 21 is supported by an arbor 22 suspended from the upper end of the body member 10 in coaxial alignment with the tubular workpiece W. A suitable quenching head 23 is shown in engagement with the heat head 21, the quench head 23 being supported on a supply tube 24 extendable coaxially upwardly from the bottom of the machine through the workpiece. The particular manner of supporting the workpiece W in the chucks 20 and the construction and operation of the heating heads forms no part of the present invention. However, reference may be made to my copending application, Serial No. 392,867, filed May 10, 1941, for a complete description and operation of these parts.

In the operation of the apparatus the carriage is first moved to the upper end of the machine, and the operation of heating and quenching takes place during the downwardly travel of the carriage. Such operation requires that the workpiece be maintained coaxial with the induction heating head 21 during the entire travel of the workpiece.

In accordance with the present invention, it is the aim to insure against any material deflection of the guide rods, or at least, to minimize deflection of the guide rods 14, particularly at the central unsupported portions of the rods. In carrying out the invention, longitudinal supporting blocks 25 are secured to the main body 10 at the corners 15 and rigidly secured to these blocks 25 by screws 26 are parallel guide bars 27 extending vertically for the full height of the guide rods 14. As will be noted in Figures 3 and 5, the guide bars 27 project forwardly and rearwardly of the supporting blocks 25.

Figure 5:
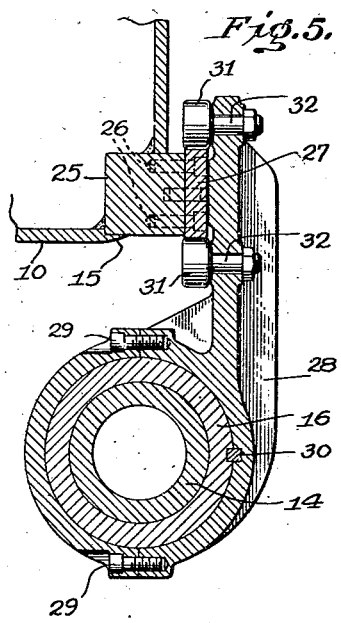
Figure 5 is a horizontal section taken substantially on line 5—5 of Figure 4.

Each of the carriage cylinders 16 is provided at its extremities with a two-part bracket 28 rigidly clamped thereto by screws 29 and locked against rotation relative thereto by an interlocking key 30. The brackets 28 extend rearwardly into the recessed region 11 and are provided with spaced guide rollers 31 mounted on suitable bolt members 32 secured to the brackets. The rollers 31 engage the forward and rearward edges of the guide bars 27, as shown in Figures 3 and 5.

The guide rollers 31 in their engagement with the guide bars 27 during the travel of the carriage thus prevent inward or outward deflection of the guide rods 14 at their central unsupported regions both during movement of the upper portion of the carriage through this region and during movement of the lower portion of the carriage through this region.

Obviously additional brackets and rollers can be similarly provided on the cylinders 16 at any desired region intermediate the ends of the same.

Various other guide arrangements well known in the art may be utilized in lieu of the rollers and guide bar described.

In the illustration, the machine shown has been scaled down from a full-sized apparatus capable of handling a twelve-foot section of tubing, the carriage and tube supported thereby having a weight of several thousand pounds.

Although the present invention has been described in connection with an induction heat treating machine, it is obvious that it is equally as applicable to many other types of machine tools, and also that various changes may be made in the detailed construction and arrangement of parts without departing from the spirit and substance of the invention, the scope of which is defined by the appended claims.

What is claimed is:

1. In a device of the character described having a frame, a guide rod spaced from said frame and secured at its ends to said frame and a carriage reciprocably mounted on said guide rod, means for preventing deflection of said guide rod during reciprocation of said carriage thereon comprising a guide bar rigidly secured to said frame parallel to said guide rod, bracket means rigidly secured to said carriage, and a pair of rollers carried by said bracket means and having their axes of rotation disposed transversely of the axis of said guide rod, said rollers engaging said guide bar at opposite sides thereof for rolling engagement therewith during reciprocation of said carriage.

2. In a device of the character described having a frame, a guide rod spaced from said frame and secured at its ends to said frame and a carriage reciprocably mounted on said guide rod, means for preventing deflection of said guide rod during reciprocation of said carriage thereon comprising a guide means on said frame extending parallel to said guide rod, and bracket means rigidly secured to said carriage and extending toward said frame, said bracket means and said guide means having relatively movable interengaging parts to prevent deflection of said guide rod toward or away from said frame.

3. In a device of the character described having a frame, spaced parallel guide rods spaced from said frame and secured at their ends to said frame and a carriage having tubular members interconnected with each other and reciprocably mounted on said guide rods, means for preventing deflection of said rods toward and away from said frame comprising, brackets means at the opposite ends of each tubular member extending toward said frame, rigid spaced guide means on said frame parallel to said guide rods, each laterally adjacent the bracket means of a tubular member, and means on the bracket means of each tubular member slidably interfitting with the adjacent guide means for unrestricted movement parallel to said guide rods and restricted against movement toward or away from said frame.

4. In a device having a reciprocable carriage, a frame, a pair of spaced guide rods spaced from said frame and secured at their ends to said frame, said guide rods supporting said carriage for reciprocation thereon, a pair of parallel spaced means on said frame parallel to said guide rods, and guide means rigidly mounted on and at the opposite ends of said carriage adjacent each of said parallel spaced means and interengaged therewith for free movement in a direction parallel to said guide rods and restricted against movement laterally thereof toward and away from said guide rods.

HOWARD E. SOMES.